Patented Oct. 22, 1929

1,732,453

UNITED STATES PATENT OFFICE

WILLIAM C. WILSON, OF CHICAGO, ILLINOIS, ASSIGNOR, BY MESNE ASSIGNMENTS, TO CUTLER-HAMMER, INC., A CORPORATION OF DELAWARE

NITROBENZENE-SULPHUR RESIN AND METHOD OF MAKING SAME

No Drawing.   Application filed June 22, 1925. Serial No. 38,919.

This invention relates to synthetic resins and methods of producing the same.

An object of the invention is to provide novel resins adapted to various uses industrially and commercially.

Another object is to produce from reactive substances resinous bodies which are adapted to be formed into various useful shapes by cold molding or hot molding operations as desired.

Another object is to employ mutually reactive substances the reaction between which may be readily controlled to provide a resin having the desired melting point.

Another object is to provide novel methods of preparing materials for hot molding or cold molding operations.

Another object is to provide methods of and means for modifying and improving the characteristics of the aforementioned resinous reaction products.

Other objects and advantages of my invention will hereinafter appear.

In accordance with my invention, nitrobenzol and sulphur are boiled together under a reflux condenser; sulphur dioxide is given off, and the mixture gradually thickens, forming a resin the melting point of which depends upon the amount of sulphur which combines with the nitrobenzol. By varying the relative proportions of the sulphur and nitrobenzol and the duration of the refluxing operation, resins of a wide range of melting points can be obtained. I may thus produce resins which are suitable for either hot or cold molding.

In all of the resins as initially prepared free nitrobenzol is present; whereas for cold molding this substance is allowed to remain in the resin (except when furfural is employed as hereinafter described), inasmuch as it acts as a solvent and facilitates mixing with an impregnation of the fibrous filler, such as asbestos. A low melting point resin is used for cold molding. For hot molding, the free nitrobenzol and other volatile substances are largely removed by treatment, preferably under conditions which permit their recovery. High melting point resins are thus obtained which can be mixed with suitable filler material and then hot molded.

A resin suitable for cold molding may be produced by placing about 369 parts of nitrobenzol and 160 parts of sulphur in a vessel provided with a suitable condenser and also preferably provided with a mechanical stirrer. The mixture is refluxed for a period of from five to seven hours with stirring, and the reaction product is a soft resin. A molding compound may be prepared by mixing 26 parts of the resin with 74 parts of asbestos in a kneading machine or other similar type of mixer. After mixing the material is disintegrated and screened to pass a 10-mesh sieve. The articles are then cold molded, and after removal from the die they are cured by heating, say, four hours at 175 degrees F., five hours at 225 degrees F., six hours at 300 degrees F. and five hours at 350 degrees F.

The relative proportions of nitrobenzol and sulphur may be widely varied in the production of both hot molding and cold molding resins. Thus, I may produce cold molding resins using 369 parts of nitrobenzol with a quantity of sulphur varying from 128 to 224 parts.

I have found that the strength of the aforedescribed resins may be increased by the addition thereto of a quantity of furfural. In this case, however, it is preferred to evaporate off the free nitrobenzol before adding the furfural. The increased strength is probably due to a reaction of the nitrobenzol sulphur resin with the furfural. To prepare a molding compound of this type, a mixture of 600 parts of nitrobenzol and 300 parts of sulphur is refluxed for a period of four and one-half hours, thus producing a soft resin. 130 parts of the resin are then mixed with 350 parts of asbestos in a kneading machine. The excess or free nitrobenzol is evaporated and 50 parts of furfural are added and intimately mixed with the resin. This mixture is then molded into the desired shapes, and the formed articles are cured by heating the same, preferably one hour at 300 degrees F., one hour at 350 degrees F., one hour at 400 degrees F., and one hour at 450 degrees F. The molded and heat treated articles will have from ten to thirty per cent greater strength than they would have without the use of furfural.

For hot molding purposes it is desirable to have a resin melting at 200 degrees F. or higher, and which gives off little or no volatile material on heating. In hot molding either one of two methods of procedure may be employed. In one case the molding compound may be in the form of a sheet, and is molded according to the so-called shellac method, in which the molding compound and the die are heated externally on a hot plate, and the compound then molded and cooled under pressure. A resin for this purpose may be produced by refluxing about 307 parts of nitrobenzol with from 256 to 480 parts of sulphur for a period of from four to six hours, and then heating the resinous reaction product in the open for about one-half hour to remove any excess of nitrobenzol. The melting point of the resin thus produced is about 250 degrees F. The molding compound is made by mixing on differential rolls about 360 parts of the resin, 370 parts of sienna, and 30 parts of cotton flock.

In the other method of hot molding, the compound in the form of a powder is placed in a cold mold and then subjected to heat and pressure. The resin is produced by refluxing 700 parts of nitrobenzol and 600 parts of sulphur for about four hours, and then heating the resulting resin in an open vessel for one-half to one hour, to remove volatile substance, as aforedescribed. The melting point of the resin is then about 270 degrees F. A molding compound may be made from 32 parts of resin and 68 parts of asbestos, the ingredients being mixed and ground in a ball mill or the like. The powder while cold is placed in a cold die and heat and pressure then applied, the temperature employed being about 300 degrees F., thus fusing and welding the particles of the compound. Thereafter the die is cooled and the finished article removed.

It will thus be apparent that I have provided novel resins and methods of producing the same for use in either hot or cold molding operations. Moreover, the steps in production of a resin of this type are readily variable and easily controlled in accordance with the particular characteristics desired in the finished or unfinished product.

What I claim and desire to secure by Letters Patent is:

1. A resinous reaction product of nitrobenzol and sulphur.

2. An article of manufacture comprising a resin which is the reaction product of nitrobenzol and sulphur.

3. An article of manufacture comprising a resin which is the reaction product of a quantity of nitrobenzol and a relatively smaller quantity of sulphur.

4. As an article of manufacture, a resin which is the reaction product of nitrobenzol and sulphur, the melting point of said resin being proportional to the quantity of sulphur employed.

5. As an article of manufacture, a low melting point resin which is the reaction product of nitrobenzol and sulphur, said resin comprising a quantity of free nitrobenzol which adapts the same to molding under pressure when mixed with a suitable filler.

6. As an article of manufacture, a resinous substance which is the reaction product of 369 parts of nitrobenzol and 128 to 577 parts of sulphur, the quantity of sulphur employed depending upon the melting point desired in the resinous substance.

7. A molding compound comprising a resin which is the reaction product of nitrobenzol and sulphur, said resin being intimately mixed with a fibrous filler material.

8. A molded plastic composition article comprising a resinous reaction product of nitrobenzol and sulphur, in combination with a fibrous filler.

9. A molded plastic composition article comprising a resin which is the reaction product of nitrobenzol and sulphur in predetermined proportions, said resin being intimately mixed with a fibrous filler and substantially free from volatile material.

10. The process which comprises production of a resinous substance by reaction of nitrobenzol and sulphur.

11. The process of producing a resinous substance which comprises boiling under a reflux condenser a quantity of nitrobenzol in the presence of a quantity of sulphur.

12. The process which comprises boiling under a reflux condenser a mixture of nitrobenzol and sulphur and continuing such treatment until a resin of the desired melting point is produced.

13. The process of producing a resinous substance which comprises boiling under a reflux condenser for a period of four to seven hours a mixture of nitrobenzol and sulphur.

14. The process of producing a resinous substance which comprises boiling under a reflux condenser for a period of four to seven hours about 369 parts of nitrobenzol and 128 to 577 parts of sulphur.

15. The process which comprises causing about 369 parts of nitrobenzol to react with 128 to 577 parts of sulphur to form a resinous product and incorporating said resinous product with a fibrous filler.

16. The process which comprises causing 369 parts of nitrobenzol to react with 128 to 577 parts of sulphur to form a resinous product, incorporating said resinous product with a fibrous filler, and subjecting the mixture to a molding operation.

17. The process which comprises causing 369 parts of nitrobenzol to react with 128 to 577 parts of sulphur to form a resinous product, incorporating the resin with a fibrous filler, subjecting the mixture to a molding operation, and thereafter heat treating the molded articles at temperatures ranging from 175 degrees F. to 450 degrees F.

18. The process of preparing a molding compound which comprises boiling under a reflux condenser a mixture of nitrobenzol and sulphur to produce a resin containing a quantity of free nitrobenzol, mixing said resin with a suitable filler, and heat treating the same to remove volatile substance.

19. The process of preparing a molding compound which comprises boiling under a reflux condenser a mixture of nitrobenzol and sulphur to produce a resin containing a quantity of free nitrobenzol, mixing said resin with a suitable filler, heat treating the same to remove volatile substance, and thereafter molding the mixture.

20. The process which comprises subjecting a mixture of nitrobenzol and sulphur to a reaction temperature, and maintaining such conditions until a resin of the desired melting point is produced.

In witness whereof, I have hereunto subscribed my name.

WILLIAM C. WILSON.